(12) United States Patent
Thornton

(10) Patent No.: X810
(45) Date of Patent: Dec. 13, 1807

(54) DISTILLING, STILL FOR

(76) Inventor: William Thornton

William Thornton

The Schedule referred to in these Letters Patent and making part of the same, containing a description in the words of the said William Thornton himself, of his new improved Stille.

It consists of a body as wide at the top as bottom, on which is fixed a conical cap or head, like an inverted funnel, on the sides of which the liquor will be condensed by a condensing vessel, being connected at the bottom of the cone and rising round and above it sufficiently high to contain as much liquor as is required to be distilled at once. This liquor may be heated in the condensing vessel when the process of the preceding distillation is sufficiently advanced, which will be shewn, not by time, but by the strength of the liquor, as exhibited by the bubble, till when, the head may be kept cool by cold water running upon it by means of an external tube entering the bottom of the condensor which applies the cold water immediately to the head, and the hot water will run off from the top by a spout on the opposite side - The head must be raised at the bottom all round, internally to carry off what vapor may be condensed into liquor, which with the uncondensed vapor will pass into the worm from the lowest part of the groove. a cock will pass through the lowest part of the outside case or condensor, and through the head of the still, a little above their junction to convey the fermented liquor or the infusion into the still after being heated in the condensor. The cock may be formed by two tubes, one in the inside of the other, with a correspondent opening in each, which being turned together will permit the liquor to pass or a cock of this or any other proper kind may be fixed at the lowest internal part of the condensor, with a long handle, by which it may be managed. In the apex or point of the still head there must be a tube rising above the top of the condensor. The stirring rod is to rise through this Tube, and be made tight by a plug formed on its top, or a small screw on the sides, which by pushing a sliding piece against the rod, prevents the escape of steam or vapor when the rod is not in actual use. By opening the plug or screw and permitting the rod to have liberty, it will rise in consequence of a cork or other float being placed near the bottom of this shank or rod, and
thereby indicate at all times, when wanted, the height of the boiling
liquor by which the fire may be completely regulated, as well as the charge
The stirring rod is to stir the liquor at the bottom of the stile, by cross
pieces formed like a rake or otherwise. The head of the stile, and condenser may be
raised by a weight and multiplied pullies, and kept so near a balance
as to be easily moved whether full or empty. The still will have a worm
and tub in the usual way, and a cock at the bottom of the Stile to
empty it as usual, also a cock to empty the Condensor of water ex
-ternally. The body of the Stile may be of metal, or of wood and metal
the head of metal or wood, and the Condensor of metal or of wood
bound with hoops.

When the Stile is to be charged with grain &c it may be done
by throwing the head up, and when the stile is not wanted, the head
being up, the Body will serve for a boiler to prepare food for Cattle,
heating water for Brewing, washing &c boiling Cyder (which however I cannot
recommend at any time in copper vessels on account of the acid of the
Cyder, making portable soup, maple sugar, making the extracts of Bark,
(or any vegetable matter) for tanning, dying, and many other purposes
During the Distillation, if the liquor is not to be charged with the grain
&c in it, the head of the Stile being luted on with Rye, or any other
paste, and paper, linen, or any other suitable substance, need not be
moved, for a day or two together, as the whole process is perfectly
manageable without - Instead of putting the materials whether of
grain or fruit into the stile, they may be put into a screw or lever
-press, and after pressing out all the liquor to be distilled, wash the
remainder in water in which more grain or fruit may be set - This
would take away the necessity of stirring, and the liquor would
not be so subject to burning. It is best to supply the Condensor
by a reservoir, which may be perfectly regulated by a cock. By a
Stile of this kind I have distilled spirit of wine, and from the trials
I have made I consider it as the most manageable, the quickest and most extensively useful, as well as cheapest Still I have ever seen. The Coppersmiths offer to make it of copper for two thirds the price of common stills of the same capacity N.B. This Boiler and Still will serve admirably for ships use, as the Head may be put on whenever fresh water is wanted from salt water.

Witnesses
Christopher S. Thom
Stephen Pleasanton

William Thornton

Patent dated 13th December 1807
Received and Recorded anew Sept 27. 1853.
1853

Exd.
[illegible]

United States Patent

Patent No.: X810

DRAFTSMAN'S DIVISION.

*All communications should be addressed to*
"The Commissioner of Patents,
Washington, D. C."

2—328 a.

*DEPARTMENT OF THE INTERIOR,*

United States Patent Office.

*Washington, D. C.,* ........................................., *189*..

*SIR:*

*The printed* ........copies........ *of Patent No.* W. Thornton
...are... *exhausted.* Dec 13 1807

*As soon as reprinted a copy will be mailed you to complete your order.*

*By direction of the Commissioner:*

*Very respectfully,*

*Chief Clerk.*

314306-97-5m